(12) United States Patent
Heideman et al.

(10) Patent No.: US 9,594,707 B2
(45) Date of Patent: Mar. 14, 2017

(54) DATA INPUT/OUTPUT (I/O) HANDLING FOR COMPUTER NETWORK COMMUNICATIONS LINKS

(71) Applicants: Michael J Heideman, Roseville, MN (US); E. Brian Garrett, Salt Lake City, UT (US); Steven M Wierdsma, Roseville, MN (US); Carl R Crandall, Roseville, MN (US)

(72) Inventors: Michael J Heideman, Roseville, MN (US); E. Brian Garrett, Salt Lake City, UT (US); Steven M Wierdsma, Roseville, MN (US); Carl R Crandall, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 310 days.

(21) Appl. No.: 14/474,745

(22) Filed: Sep. 2, 2014

(65) Prior Publication Data

US 2016/0062912 A1    Mar. 3, 2016

(51) Int. Cl.
*G06F 13/28*    (2006.01)

(52) U.S. Cl.
CPC ................... *G06F 13/28* (2013.01)

(58) Field of Classification Search
None
See application file for complete search history.

(56) References Cited

U.S. PATENT DOCUMENTS 7,055,152 B1 * 5/2006 Ganapathy ............ G06F 9/5016
709/234
7,370,174 B2 * 5/2008 Arizpe ................ G06F 12/1081
711/137

\* cited by examiner

*Primary Examiner* — Idriss N Alrobaye
*Assistant Examiner* — Richard B Franklin
(74) *Attorney, Agent, or Firm* — Richard J. Gregson

(57) ABSTRACT

Systems and methods for performing data input/output (I/O) operations using a computer network communications link are described. A method may include assigning a block of virtual addresses for usage with at least one computer network communications link. The method may also include registering the entire block of virtual addresses prior to an operating system partition performing I/O operations using the at least one computer network communications link, wherein registering comprises setting a plurality of virtual page frame numbers of the block of virtual addresses to point to distinct pages of physical memory. In some embodiments, one or more I/O operations may be performed using the at least one computer network communications link and the registered block of virtual addresses.

6 Claims, 6 Drawing Sheets

DATA INPUT/OUTPUT (I/O) HANDLING FOR COMPUTER NETWORK COMMUNICATIONS LINKS

FIELD OF THE DISCLOSURE

The instant disclosure relates to data input/output (I/O) handling. More specifically, this disclosure relates to improved data I/O handling for performing data I/O operations in computer systems using computer network communications links.

BACKGROUND

Computer systems often include multiple processors to execute various operations. For example, some computer systems may employ one processor to handle the execution of the main instructions for an operating system (OS) and another processor to handle the execution of I/O operations. A physical communications link, such as a computer network communications link, may be employed to facilitate communication between the various processors. One example of a computer network communications link is an InfiniBand link.

Several drawbacks that impact the overall performance of the computer system are a direct result of the computer network communications link employed to facilitate communication between the various processors in the computer system. For example, some computer network communications links use OS bypass in the main data transfer paths to obtain low latency and high throughput. In addition, some computer network communications links use virtual addresses, as opposed to physical addresses, to describe areas of memory requiring data transfer.

One particular cause of significant performance degradation relates to memory registration and deregistration. For example, computer network communications links require that a virtual address (VA) area be registered with the computer network communications link prior to performing any data transfers with the VA area. In addition, computer network communications links also require that the VA area be deregistered when an I/O operation using the VA area is complete. That is, for each and every I/O operation the VA area to be used for the I/O operation must be registered and deregistered. Because (1) each I/O operation requires a corresponding registration and deregistration of a VA area, (2) different VA areas are used for different I/O operations, (3) registration and deregistration of VA areas are larger-than-normal time-consuming tasks, and (4) many I/O operations are usually performed, the performance degradation of a computer system using a computer network communications link may be prohibitively large.

SUMMARY

The performance of computer systems utilizing computer network communications links may be improved by performing message transmission and remote direct memory access (RDMA) operations using low latency and OS bypass mechanisms from any user VA area to any physical address (PA) area without requiring buffer copies or memory registration and deregistration per operation. According to one embodiment, a method may include assigning a block of virtual addresses for usage with at least one computer network communications link. The method may also include registering the entire block of virtual addresses prior to an operating system partition performing I/O operations using the at least one computer network communications link, wherein registering comprises setting a plurality of virtual page frame numbers of the block of virtual addresses to point to distinct pages of physical memory. The method may further include performing one or more I/O operations using the at least one computer network communications link and the registered block of virtual addresses.

According to another embodiment, a computer program product may include a non-transitory computer-readable medium comprising code to perform the step of assigning a block of virtual addresses for usage with at least one computer network communications link. The medium may also include code to perform the step of registering the entire block of virtual addresses prior to an operating system partition performing I/O operations using the at least one computer network communications link, wherein registering comprises setting a plurality of virtual page frame numbers of the block of virtual addresses to point to distinct pages of physical memory. The medium may further include code to perform the step of performing one or more I/O operations using the at least one computer network communications link and the registered block of virtual addresses.

According to yet another embodiment, an apparatus may include a memory, and a processor coupled to the memory. The processor may be configured to execute the step of assigning a block of virtual addresses for usage with at least one computer network communications link. The processor may also be configured to execute the step of registering the entire block of virtual addresses prior to an operating system partition performing I/O operations using the at least one computer network communications link, wherein registering comprises setting a plurality of virtual page frame numbers of the block of virtual addresses to point to distinct pages of physical memory. The processor may be further configured to perform the step of performing one or more I/O operations using the at least one computer network communications link and the registered block of virtual addresses.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
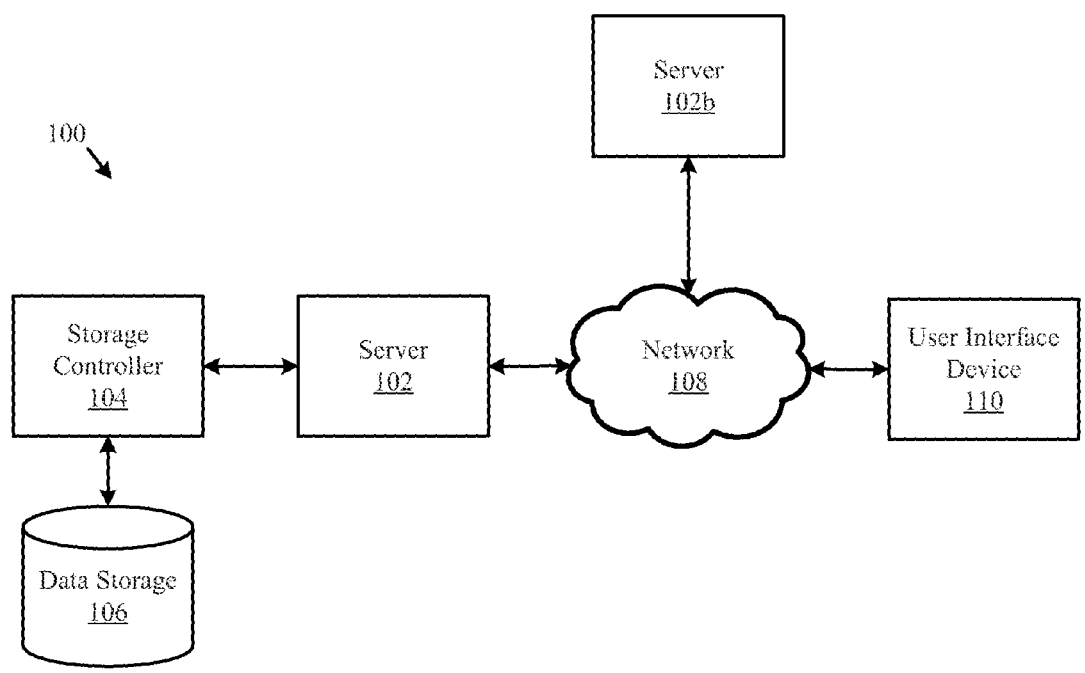
FIG. 1 is a block diagram illustrating a computer network according to one embodiment of the disclosure.

FIG. 1 illustrates one embodiment of a system 100 for performing data I/O operations using a computer network communications link according to one embodiment of the disclosure. The system 100 may include a server 102, a data storage device 106, a network 108, and a user interface device 110. The server 102 may also be a hypervisor-based system executing one or more guest partitions hosting operating systems with modules having server configuration information. In a further embodiment, the system 100 may include a storage controller 104, or a storage server configured to manage data communications between the data storage device 106 and the server 102 or other components in communication with the network 108. In an alternative embodiment, the storage controller 104 may be coupled to the network 108.

In one embodiment, the user interface device 110 is referred to broadly and is intended to encompass a suitable processor-based device such as a desktop computer, a laptop computer, a personal digital assistant (PDA) or tablet computer, a smartphone or other mobile communication device having access to the network 108. In a further embodiment, the user interface device 110 may access the Internet or other wide area or local area network to access a web application or web service hosted by the server 102 and may provide a user interface for enabling a user to enter or receive information.

The network 108 may facilitate communications of data between the server 102 and the user interface device 110. In some embodiments, the network 108 may also facilitate communication of data between the server 102 and other servers/processors, such as server 102b.

For example, the network 108 may include a switched fabric computer network communications link to facilitate communication between servers/processors. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 2:
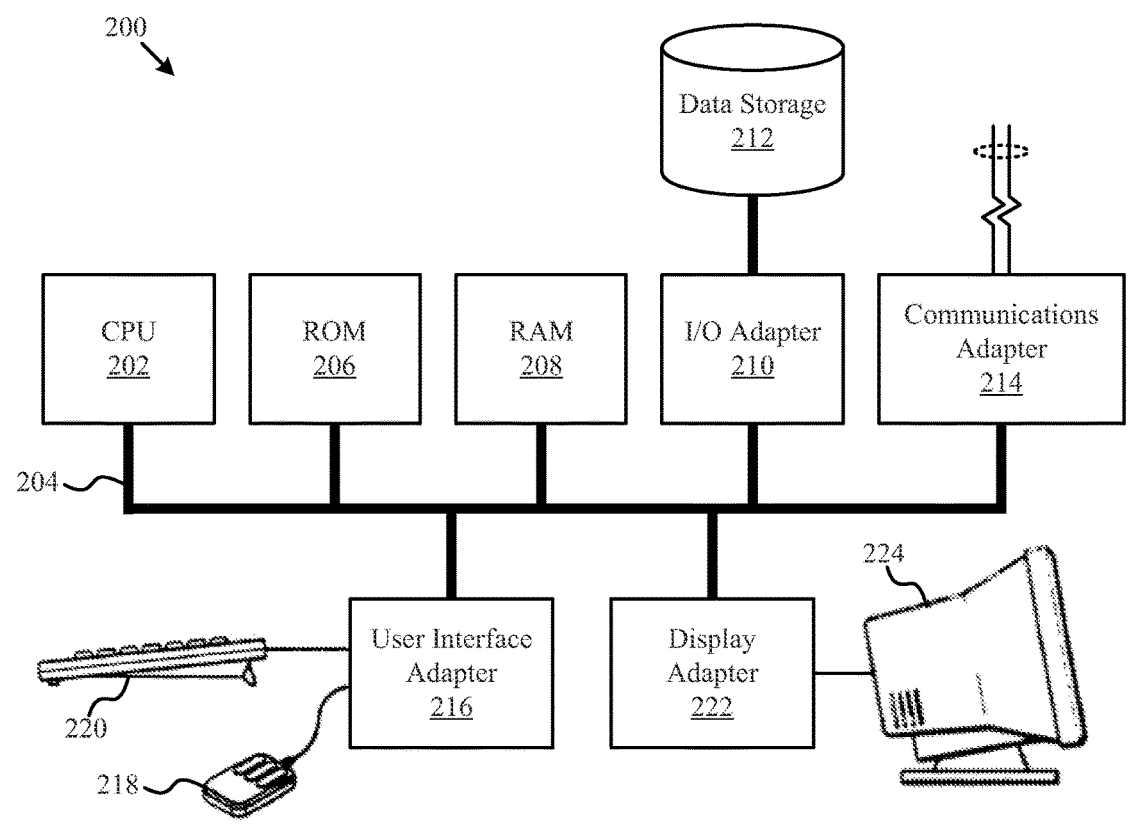
FIG. 2 is a block diagram illustrating a computer system according to one embodiment of the disclosure.

FIG. 2 illustrates a computer system 200 adapted according to certain embodiments of the server 102 and/or the user interface device 110. The central processing unit ("CPU") 202 is coupled to the system bus 204. The CPU 202 may be a general purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 may also include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an I/O adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 108, which may be one or more of a LAN, WAN, and/or the Internet. In other embodiments, the communications adapter 214 may include a switched fabric computer network communications link to facilitate communication between computer system 200 and another computer system (not shown). For example, the switched fabric computer network communications link 214 may facilitate communication between CPU 202 and another CPU (not shown) of another computer system (not shown). The user interface adapter 216 couples user input devices, such as a keyboard 220, a pointing device 218, and/or a touch screen (not shown) to the computer system 200. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing device that may be adapted to perform the functions of the server 102 and/or the user interface device 110. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Figure 3A:
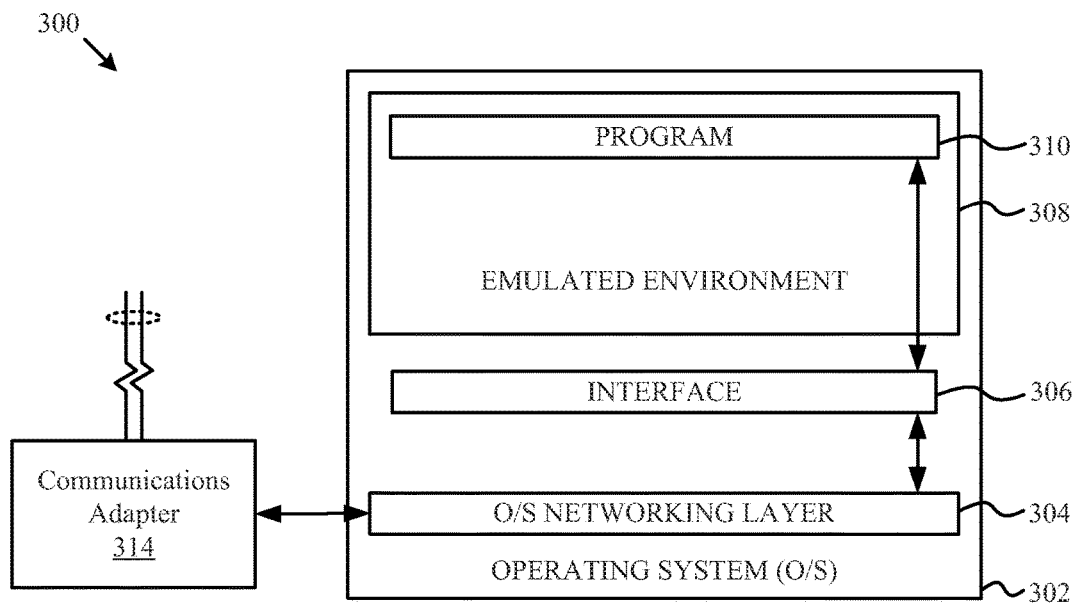
FIG. 3A is a block diagram illustrating a server hosting an emulated software environment for virtualization according to one embodiment of the disclosure.

FIG. 3A is a block diagram illustrating a server hosting an emulated software environment for virtualization according to one embodiment of the disclosure. An operating system 302 executing on a server includes drivers for accessing hardware components, such as a networking layer 304 for accessing the communications adapter 314. The operating system 302 may be, for example, Linux or Windows. An emulated environment 308 in the operating system 302 executes a program 310, such as Communications Platform (CPComm) or Communications Platform for Open Systems (CPCommOS). The program 310 accesses the networking layer 304 of the operating system 302 through a non-emulated interface 306, such as extended network input output processor (XNIOP). The non-emulated interface 306 translates requests from the program 310 executing in the emulated environment 308 for the networking layer 304 of the operating system 302.

Figure 3B:
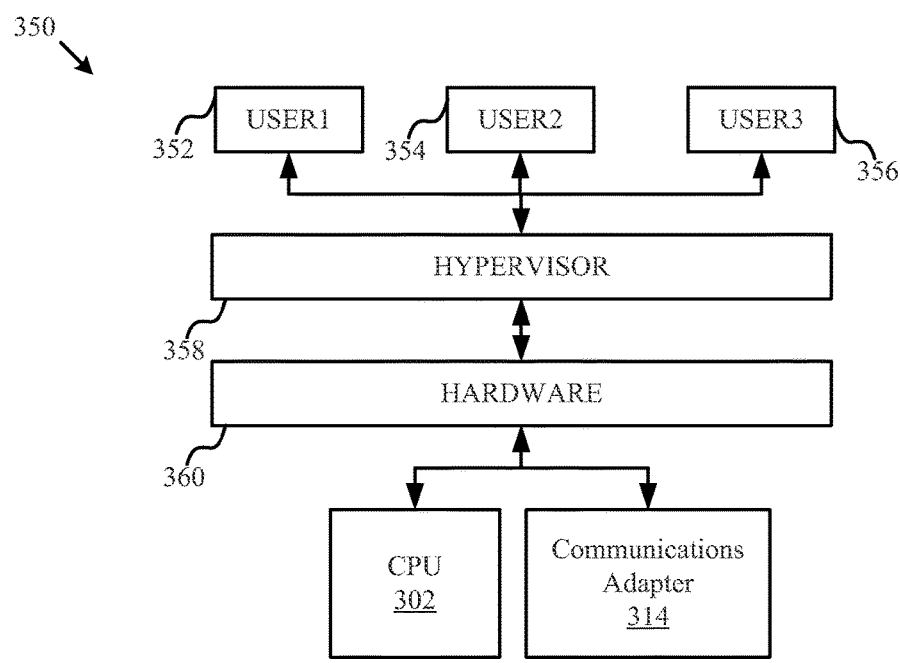
FIG. 3B is a block diagram illustrating a server hosting an emulated hardware environment according to one embodiment of the disclosure.

In another example, hardware in a computer system may be virtualized through a hypervisor. FIG. 3B is a block diagram illustrating a server hosting an emulated hardware environment according to one embodiment of the disclosure. Users 352, 354, 356 may access the hardware 360 through a hypervisor 358. The hypervisor 358 may be integrated with the hardware 360 to provide virtualization of the hardware 360 without an operating system, such as in the configuration illustrated in FIG. 3A. The hypervisor 358 may provide access to the hardware 360, including the CPU 202 and the communications adaptor 214.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
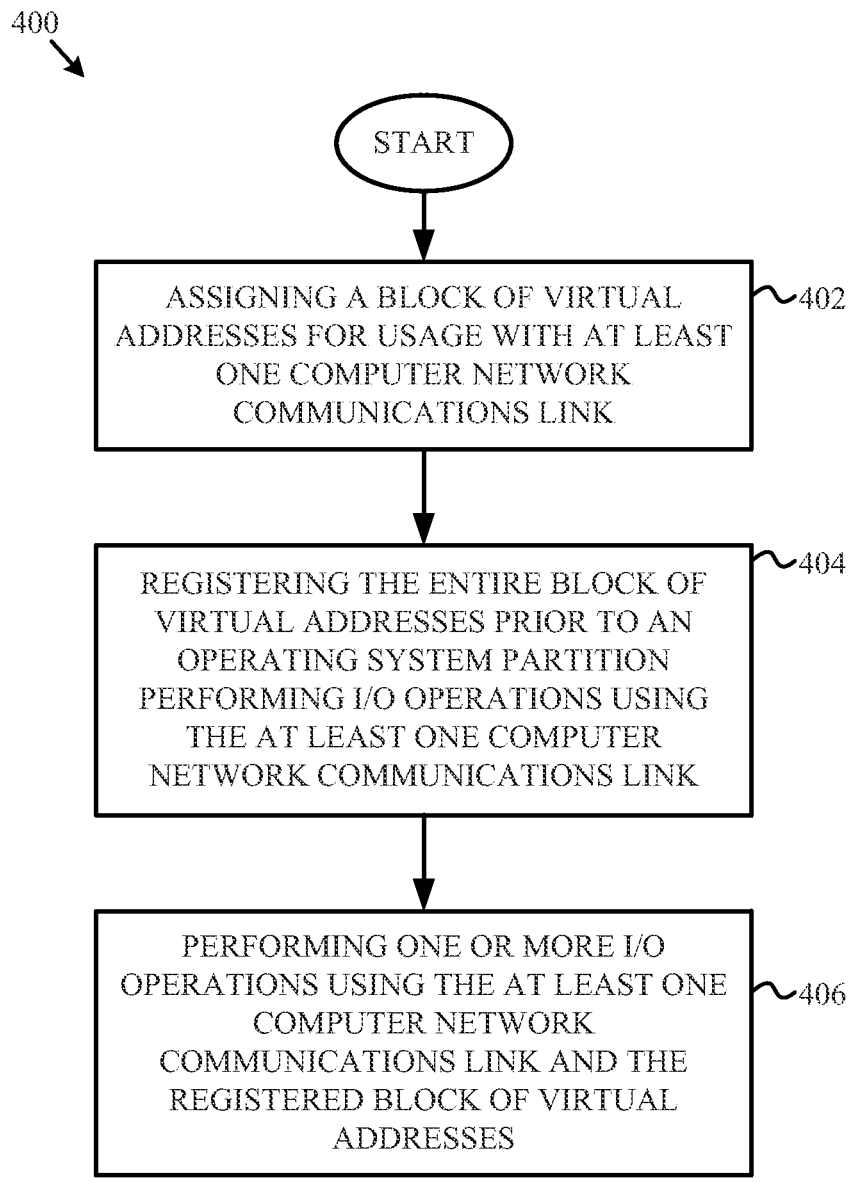
FIG. 4 is a flow chart illustrating a method for performing data input/output (I/O) operations using at least one computer network communications link according to one embodiment of the disclosure.

FIG. 4 illustrates a method 400 for performing data input/output (I/O) operations using at least one computer network communications link according to one embodiment of the disclosure. In some embodiments, a method for performing data I/O operations using a computer network communications link as disclosed herein may modify the OS Kernel to create a new type of scatter/gather entries for the entire range of physical memory. For example, the new type of scatter/gather entries created in accordance with embodiments of the disclosure may describe the mapping between virtual addresses and physical addresses without the memory associated with the physical addresses being pinned. It is noted that embodiments of method 400 may be implemented with the systems described above with respect to FIGS. 1-3. Specifically, method 400 includes, at block 402, assigning a block of virtual addresses for usage with at least one computer network communications link. One example of a computer network communications link is an InfiniBand link. According to one embodiment, the size of the block of virtual addresses may be equal to the size of the physical memory. In addition, in some embodiments, the assigned block of virtual addresses can only be used by the at least one computer network communications link. For example, a computer system may utilize multiple computer network communications links that use the same protocol to perform I/O operations. In embodiments in which the computer network communications links use the same protocol to perform I/O operations, the assigned block of virtual addresses may be used by each of the links to perform I/O operations. However, in some embodiments, the assigned block of virtual addresses may not be given out or used by any other application(s) and/or user(s).

At block 404, method 400 includes registering the entire block of virtual addresses prior to an operating system partition performing I/O operations using the at least one computer network communications link. According to one embodiment, registering may include setting a plurality of virtual page frame numbers of the block of virtual addresses to point to distinct pages of physical memory. By setting the plurality of virtual page frame numbers of the block of virtual addresses to point to distinct pages of physical memory, the pages may serve as placeholders indicating where data will eventually be read from or written to in the physical memory. However, because the VA area (block of virtual addresses) has already been registered, the computer network communications link operates under the impression that the VA area is ready for direct hardware transfers, such as DMAs. As a result, I/O operations may be performed using the assigned VA area without each I/O operation requiring a corresponding registration of memory or deregistration of memory.

Method 400 further includes, at block 406, performing one or more I/O operations using the at least one computer network communications link and the registered block of virtual addresses. As previously noted, in some embodiments, the one or more I/O operations may be performed without each I/O operation being associated with a distinct memory registration or a distinct memory deregistration. According to one embodiment, with every executed I/O operation, the OS instructions to pin or unpin the associated memory may be executed to ensure that DMA operations by the computer network communications link operate properly.

Figure 5:
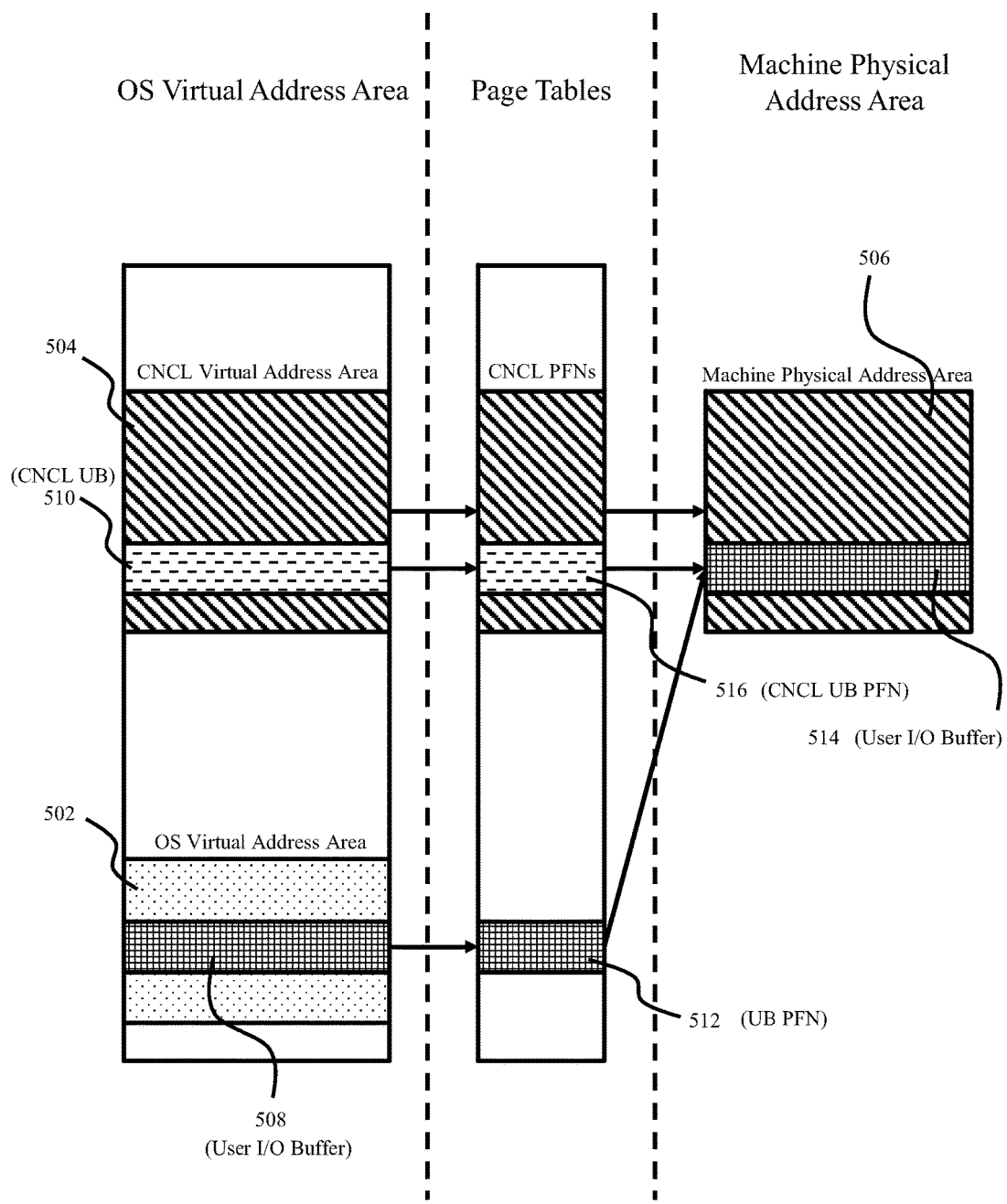
FIG. 5 is a block diagram illustrating the handling of a data I/O operation executed on a computer system using a computer network communications link according to one embodiment of the disclosure.

FIG. 5 provides a block diagram illustrating the handling of a data I/O operation executed on a computer system using a computer network communications link according to one embodiment of the disclosure. OS virtual address area 502 may correspond to a VA area acquired by the computer system on behalf of a user of the computer system. Computer network communications link (CNCL) virtual address area 504 may correspond to a VA area registered with the CNCL prior to the OS partition performing I/O operations using the CNCL. In addition, the size of the CNCL VA area 504 may be equal to the size of the machine physical address area 506.

According to an embodiment, an instruction to perform an I/O operation may be received, for example, by a processor of the computer system. As an example, and not limitation, the instruction may be a read of 512 words to a buffer that is aligned on a physical memory page boundary. The user's 110 buffer to which the data is to be read may correspond to user I/O buffer 508 within OS VA Area 502. The computer system may then identify a PA area to use before performing the I/O operation. For example, the computer system may dynamically associate a VA area, such as user I/O buffer 508 in OS VA area 502, with a PA area, such as user I/O buffer 514 in physical memory 506, to perform the I/O operation in response to receiving the instruction to perform the I/O operation. In some embodiments, the VA area dynamically associated with the PA area, such as user I/O buffer 508, may not be a virtual address area within the assigned block of virtual addresses, such as CNCL VA area 504. In other embodiments, the VA area dynamically associated with the PA area may be a virtual address area within the assigned block of virtual addresses. The assigned block of virtual addresses may be combined with the identified PA area to obtain a combined block of virtual addresses. For example, the assigned block of virtual addresses may be dynamically combined with the block of physical addresses dynamically associated with the virtual address area to dynamically obtain a combined block of virtual addresses. The block of physical addresses may be a contiguous or a non-contiguous block of physical addresses. As an example with reference to FIG. 5, the VA area corresponding to user I/O buffer 508 and the starting address of CNCL VA area 504 may be dynamically combined such that the user I/O buffer 508 is defined within the CNCL VA area 504 as shown in FIG. 5 in which the user's buffer (CNCL UB) 510 is defined within the CNCL VA area 504. Although two user buffers are defined, e.g., user I/O buffer 508 in OS VA area 502 and CNCL user I/O buffer 510 in CNCL VA area 504, the page frame numbers for both of the buffer areas point to the same page in physical memory. For example, user buffer page frame number 512 corresponding to user I/O buffer 508 in OS VA area 502 points to the same page of physical memory, e.g., user 110 buffer page 514 in physical memory, as CNCL user buffer page frame number 516 corresponding to CNCL user I/O buffer 510 in the CNCL VA area 504. According to one embodiment, the computer system may subsequently instruct at least one computer network communications link to perform a direct memory access (DMA) I/O operation using the combined block of virtual addresses, e.g., CNCL VA area 504, and the physical memory 506. For example, in some embodiments, the computer system may instruct the at least one computer network communications link to perform a direct memory access I/O operation using the dynamically allocated virtual address area, such as user I/O buffer 508 in OS VA area 502, and the dynamically associated physical address area, such as user I/O buffer 514 in physical memory 506, based, at least in part, on the combined block of virtual addresses, such as CNCL VA area 504, and the physical memory 506. In some embodiments, the dynamic association between the virtual address area and physical address area may remain unchanged while the I/O operation is performed. As discussed above, in one embodiment, the computer system may associate the virtual address area with the physical address area before instructing the at least one computer network communications link to perform the DMA I/O operation. In addition, the computer system may disassociate the virtual address area from the physical address area after the I/O operation has been performed.

Figure 6:
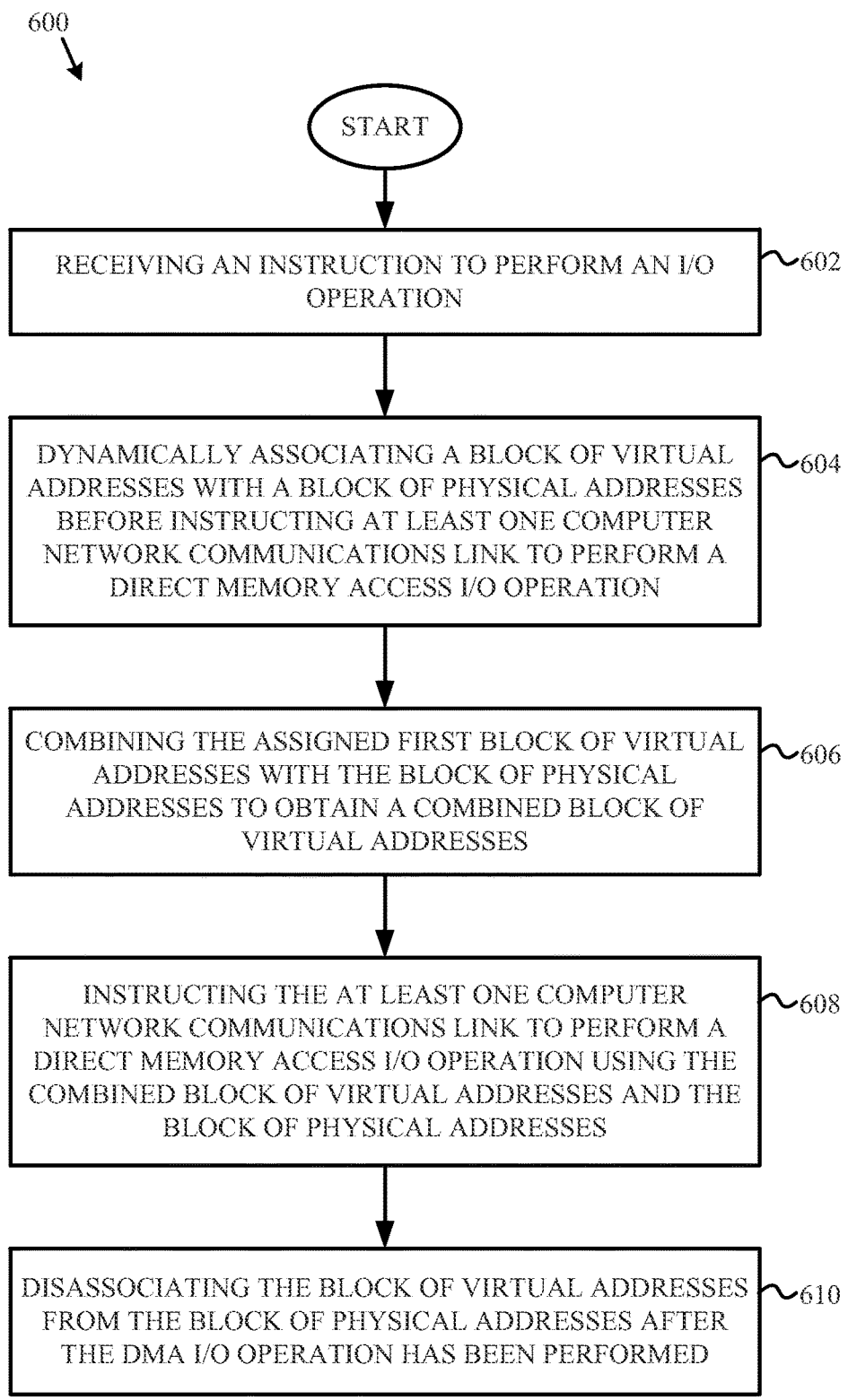
FIG. 6 is a flow chart illustrating a method for handling data I/O operations executed on a computer system using a computer network communications link according to one embodiment of the disclosure.

FIG. 6 illustrates a method 600 for handling data I/O operations executed on a computer system using a computer network communications link according to an embodiment of the disclosure. It is noted that embodiments of method 600 may be implemented with the systems described above with respect to FIGS. 1-3. Specifically, method 600 includes, at block 602, receiving an instruction to perform an I/O operation. At block 604, method 600 includes dynamically associating a block of virtual addresses with a block of physical addresses before instructing at least one computer network communications link to perform a direct memory access I/O operation. In some embodiments, the block of virtual addresses may not be a block of virtual addresses within the assigned first block of virtual addresses. In other embodiments, the block of virtual addresses may be a block of virtual addresses within the assigned block of virtual addresses. Method 600 further includes, at block 606, combining the assigned first block of virtual addresses with the block of physical addresses to obtain a combined block of virtual addresses. At block 608, method 600 includes instructing the at least one computer network communications link to perform a direct memory access I/O operation using the combined block of virtual addresses and the block of physical addresses. In some embodiments, the dynamic association between the virtual address area and physical address area may remain unchanged while the I/O operation is performed. At block 610, method 600 includes disassociating the block of virtual addresses from the block of physical addresses after the DMA I/O operation has been performed.

The schematic flow chart diagrams of FIGS. 4 and 6 are generally set forth as logical flow chart diagrams. As such, the depicted order and labeled steps are indicative of aspects of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

The servers, processors, interfaces, and communication systems described above with respect to FIGS. 4-6 may include the servers, processors, interfaces, and communication systems described with respect to FIGS. 1-3. For example, according to one embodiment, each of the servers and processors disclosed above may be configured similarly to the server 102 of FIG. 1 and central processing unit ("CPU") 202 of FIG. 2. In addition, the computer network communications link may correspond to a switching fabric computer network communications link, such as communications adapter 214 of FIG. 2, or network 108 of FIG. 1 which allows multiple servers/processors to communicate. While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details or interrelationships between embodiments.

Those of skill would appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

In some embodiments, the techniques or steps of a method described in connection with the aspects disclosed herein may be embodied directly in hardware, in software executed by a processor, or in a combination of the two. In some aspects of the disclosure, any software module, software layer, or thread described herein may comprise an engine comprising firmware or software and hardware configured to perform aspects of the described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

While the aspects of the disclosure described herein have been described with reference to numerous specific details, one of ordinary skill in the art will recognize that the aspects of the disclosure can be embodied in other specific forms without departing from the spirit of the aspects of the disclosure. Thus, one of ordinary skill in the art would understand that the aspects described herein are not to be limited by the foregoing illustrative details, but rather are to be defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for performing data in input/output (I/O) operations using at least one computer network communications link, comprising:
    assigning a first block of virtual addresses, equal to the size of available physical memory, for exclusive usage with at least one computer network communications link;
    registering the entire first block of virtual addresses prior to an operating system partition performing I/O operations using the at least one computer network communications link, wherein registering comprises setting a plurality of virtual page frame numbers of the first block of virtual addresses to point to distinct pages of physical memory;
    performing one or more I/O operations using the at least one computer network communications link and the registered first block of virtual addresses, wherein the one or more I/O operations are performed without each I/O operation being associated with a distinct memory registration or a distinct memory deregistration;
    receiving an instruction to perform an I/O operation;
    combining the assigned first block of virtual addresses with a block of physical addresses to obtain a combined second block of virtual addresses;
    instructing the at least one computer network communications link to perform a direct memory access I/O operation using the combined second block of virtual addresses and the block of physical addresses;
    dynamically associating a third block of virtual addresses with the block of physical addresses before instructing the at least one computer network communications link to perform the direct memory access I/O operation; and
    disassociating the third block of virtual addresses from the block of physical addresses after the direct memory access I/O operation has been performed.

2. The method of claim 1, wherein the third block of virtual addresses is not a block of virtual addresses within the assigned first block of virtual addresses.

3. A computer program product, comprising a non-transitory computer-readable medium comprising code to perform the steps of:
- assigning a first block of virtual addresses, equal to the size of the physical memory, for exclusive usage with at least one computer network communications link;
- registering the entire first block of virtual addresses prior to an operating system partition performing one or more I/O operations are performed without each I/O operation being associated with a distinct memory registration or a distinct memory deregistration, wherein registering comprises setting a plurality of virtual page frame numbers of the first block of virtual addresses to point to distinct pages of physical memory;
- performing one or more I/O operations using the at least one computer network communications link and the registered first block of virtual addresses;
- receiving an instruction to perform an I/O operation;
- combining the assigned first block of virtual addresses with a block of physical addresses to obtain a combined second block of virtual addresses; and
- instructing the at least one computer network communications link to perform a direct memory access I/O operation using the combined second block of virtual addresses and the block of physical addresses; and
- dynamically associating a third block of virtual addresses with the block of physical addresses before instructing the at least one computer network communications link to perform the direct memory access I/O operation; and
- disassociating the third block of virtual addresses from the block of physical addresses after the direct memory access I/O operation has been performed.

4. The computer program product of claim 3, wherein the third block of virtual addresses is not a block of virtual addresses within the assigned first block of virtual addresses.

5. An apparatus, comprising:
- a memory; and
- a processor coupled to the memory, the processor configured to execute the steps of:
- assigning a first block of virtual addresses, is equal to the size of the physical memory, for exclusive usage with at least one computer network communications link;
- registering the entire first block of virtual addresses prior to an operating system partition performing I/O operations using the at least one computer network communications link, wherein registering comprises setting a plurality of virtual page frame numbers of the first block of virtual addresses to point to distinct pages of physical memory; and
- performing one or more I/O operations using the at least one computer network communications link and the registered first block of virtual addresses, wherein the one or more I/O operations are performed without each I/O operation being associated with a distinct memory registration or a distinct memory deregistration;
- receiving an instruction to perform an I/O operation;
- combining the assigned first block of virtual addresses with a block of physical addresses to obtain a combined second block of virtual addresses; instructing the at least one computer network communications link to perform a direct memory access I/O operation using the combined second block of virtual addresses and the block of physical addresses; and
- dynamically associating a third block of virtual addresses with the block of physical addresses before instructing the at least one computer network communications link to perform the direct memory access I/O operation; and
- disassociating the third block of virtual addresses from the block of physical addresses after the direct memory access I/O operation has been performed.

6. The apparatus of claim 5, wherein the third block of virtual addresses is not a block of virtual addresses within the assigned first block of virtual addresses.

\* \* \* \* \*